United States Patent [19]

Fontaine et al.

[11] Patent Number: 4,561,894
[45] Date of Patent: Dec. 31, 1985

[54] CALCIUM OXIDE BASED FLUX COMPOSITIONS

[75] Inventors: Paul I. Fontaine, Solihull; Evan T. R. Jones, Sutton Coldfield; John K. Batham, Brierley Hill, all of England

[73] Assignee: Foseco International Limited, Birmingham, England

[21] Appl. No.: 756,569

[22] Filed: Jul. 18, 1985

Related U.S. Application Data

[63] Continuation of Ser. No. 535,159, Sep. 23, 1983, abandoned.

[30] Foreign Application Priority Data

Oct. 16, 1982 [GB] United Kingdom ............... 8229624

[51] Int. Cl.$^4$ ........................... C22B 9/10; C21C 7/00
[52] U.S. Cl. ........................................... 75/257; 75/53
[58] Field of Search ................ 75/257, 53, 58; 148/26

[56] References Cited

U.S. PATENT DOCUMENTS 2,825,947  3/1958  Goss .................................... 75/257
3,857,698  12/1974 Gilpin .................................. 148/26
4,340,426  7/1982  Tabei et al. ......................... 75/257

FOREIGN PATENT DOCUMENTS 0015417   9/1980  European Pat. Off. ............. 75/257
0017713  10/1980  European Pat. Off. ............. 75/257
0040044  11/1981  European Pat. Off. .
0043705   1/1982  European Pat. Off. ............. 75/257
2112118   6/1972  France ................................. 75/257
WO79/00398 7/1979 PCT Int'l Appl. .................. 75/257
2039536A  8/1980  United Kingdom .................. 75/257

Primary Examiner—Peter D. Rosenberg
Attorney, Agent, or Firm—Cushman, Darby & Cushman

[57] ABSTRACT

A particulate flux composition suitable for desulphurizing and/or dephosphorizing molten ferrous metals and for use as a mould flux comprises prefused particles comprising calcium oxide and at least one other component, such as alumina, iron oxide, calcium fluoride, magnesium fluoride, sodium fluoride, silica, sodium oxide, zirconium oxide, titanium oxide or sodium borate, and in which each particle has a substantially vitreous amorphous structure. The composition is highly resistant to hydration and does not introduce hydrogen into the molten metal.

13 Claims, 5 Drawing Figures

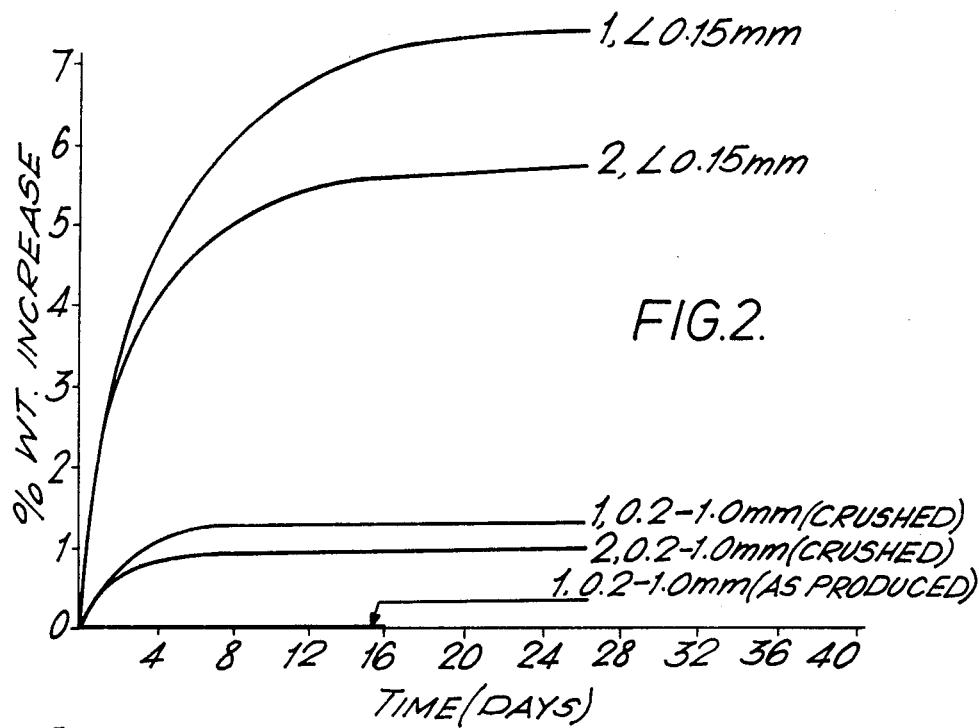
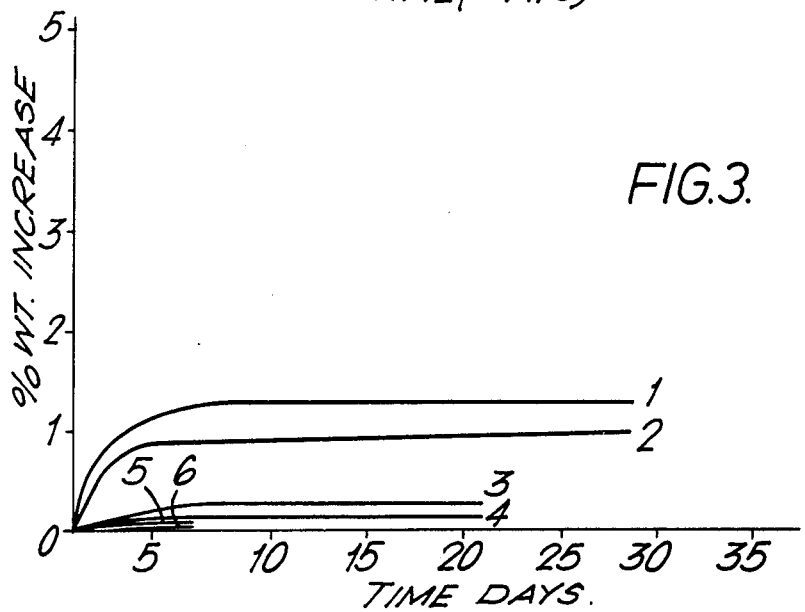

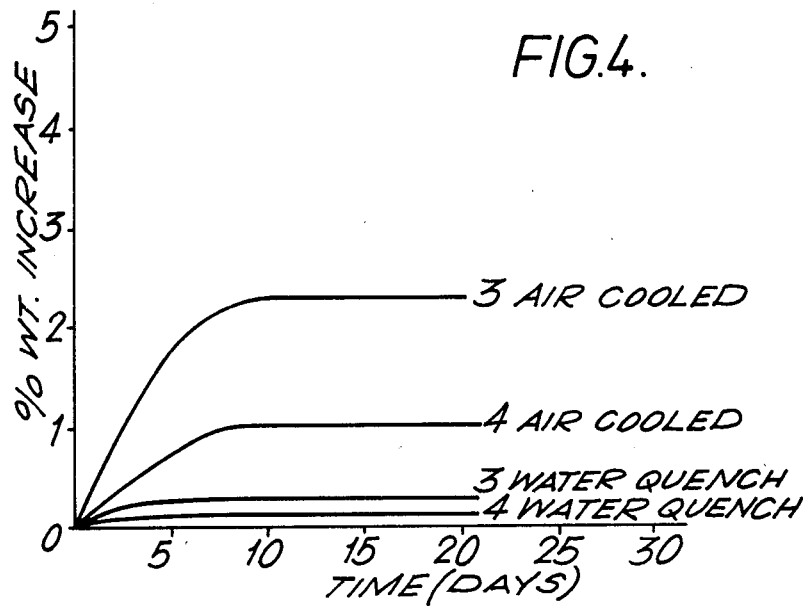
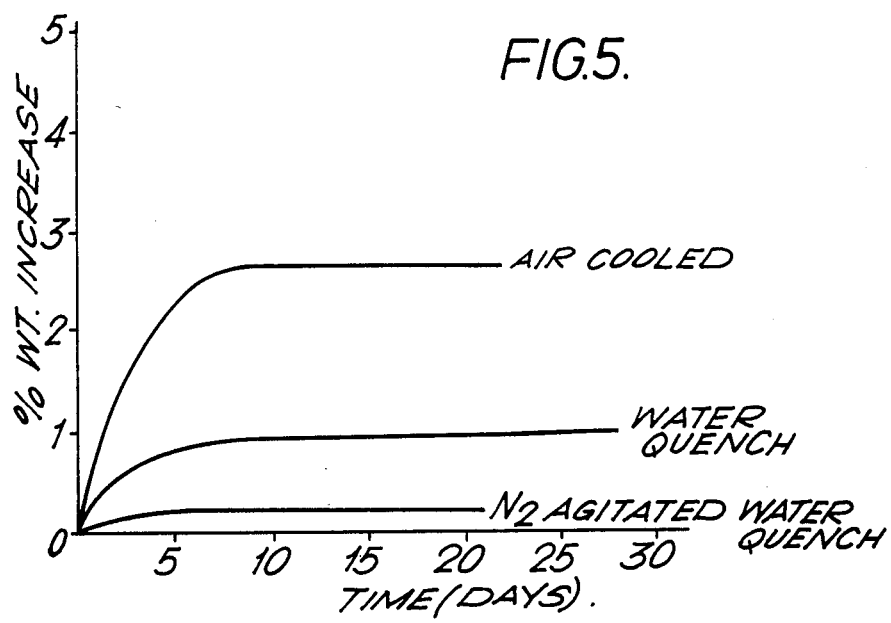

CALCIUM OXIDE BASED FLUX COMPOSITIONS

This is a continuation of application Ser. No. 535,159, filed Sept. 23, 1983, which was abandoned upon the filing hereof.

This invention relates to calcium oxide based flux compositions for treating molten metals, and particularly to calcium oxide based compositions for desulphurising and/or dephosphorising molten ferrous metals and for use as mould fluxes.

It is well-known to use either calcium silicide or a lime-containing product for the desulphurisation of ferrous melts the efficiency of reactivity being highest when the desulphurising agent is injected subcutaneous to the ferrous melt surface.

Calcium silicide is the most widely used material for desulphurising steel despite the fact that it is reactive towards moisture and water vapour and needs careful packaging to prevent entry of hydrogen into the molten steel.

Whilst the high basicity of lime (CaO) is advantageous in desulphurisation, the desulphurisation level achievable by using lime by itself is poor, and this may be attributed to the fact that the very high melting point of lime means that lime does not fuse at typical molten iron and steel temperatures. For this reson it is usual to employ a fluxing agent e.g. calcium fluoride with the lime in order that the desulphurisation agent should fuse to form a liquid desulphurising slag. Compositions based on lime and alumina are also used and compositions containing calcium fluoride and/or alumina in addition to lime are more efficient desulphurising agents than lime itself.

When used to treat molten metals powdered, crystalline lime and lime-containing compositions have the disadvantage that because they are susceptible to hydration they introduce hydrogen into the molten metal. Hydration also adversely affects the relatively poor powder flow characteristics of lime and lime-containing compositions. Various methods have been tried to overcome these problems for example by coating the lime particles or by prefusing the lime and other constituents but no completely successful commercially acceptable product has been made.

It has now been found that hydration of lime-containing compositions can be effectively prevented if the composition is prefused and converted to particles having an amorphous structure.

According to the invention there is provided a particulate flux composition which comprises prefused particles comprising calcium oxide and at least one other component and in which each particle has a substantially vitreous amorphous structure.

The other components which are present in the prefused flux particles will be chosen according to the requirements of the application for which the flux is to be used, and flux compositions for various applications will be discussed in more detail later. Examples of other components include alumina, iron oxide, calcium fluoride, magnesium fluoride, sodium fluoride, silica, sodium oxide, zirconium oxide, titanium oxide and sodium borate.

In order to produce prefused particles having the desired vitreous amorphous structure the flux components, or materials from which they can be derived, for example calcium carbonate in the case of the calcium oxide and sodium carbonate in the case of sodium oxide, must be melted and the molten mixture must then be converted to droplets which are cooled rapidly to produce solid particles, the droplet size and cooling rate being chosen so that each solid particle has a structure which is preferably more than 80% and more preferably more than 95% amorphous.

Electric arc melting furnaces used for melting glasses are suitable for producing the particulate flux compositions of the invention particularly if operation of the furnace is such that condensation of any volatile components of the composition, such as fluorides, is ensured thus keeping vaporisation losses to a minimum. The components from which the amorphous particles are produced are preferably melted together at a temperature of approximately 1320° C. to approximately 1410° C. the actual temperature depending on the particular components used. Below this temperature range there is a tendency for the molten composition to start to solidify prematurely thus preventing the formation of a fully amorphous frit, while above this temperature range there is a greater tendency for volatile components to be lost.

The molten flux composition is poured via a chamber or tundish through one or more nozzles so as to produce liquid flux streams of controlled diameter. Amorphous particles having a controlled particle size are then produced by quenching the streams in a water tank having high pressure water jets or gas jets. Subsequent to production the amorphous flux particles are removed from the water tank and dried. Other types of apparatus and processes involving rapid cooling and fritting of molten compositions may also be used. Preferably the conditions for producing the liquid flux streams and quenching them to produce the amorphous particles are chosen so as to produce particles which are predominantly in the range 0.05–2.0 mm, preferably 0.2–1.00 mm.

In order to determine whether particles of the desired amorphous structure are being obtained a small addition (of the order of 0.1–0.2% by weight) of a colouring material may be included in the molten composition, for example, chromic oxide to produce a green colour or potassium permanganate a red-brown colour. If the cooling rate of the flux particles is too slow a devitrified structure is formed which is opaque and generally off white or of a much less defined colour, whereas when the cooling rate is sufficiently rapid a product having a uniform colour and an amorphous structure is obtained.

The particulate flux compositions of the invention may be used for a variety of applications in the metallurgical industry, and the invention also includes a method of desulphurising molten steel and a method of desulphurising and/or dephosphorising molten iron which methods comprise contacting the molten steel or iron with a flux composition which comprises prefused particles comprising calcium oxide and at least one other component and in which each particle has a substantially vitreous amorphous structure.

Flux compositions which may be used to produce slag for desulphurising molten steel preferably contain prefused amorphous particles consisting of, by weight:

35–70% calcium oxide
20–60% alumina
0–15% calcium fluoride (preferably 3–10%)
0–15% magnesium fluoride (preferably 3–10%)
0–20% sodium oxide (preferably 5–15%).

Although a composition containing only calcium oxide and alumina gives a slag having a relatively high sulphide capacity, i.e. ability to retain sulphur removed from molten steel during interaction between the slag and the metal, the sulphide capacity of the slag is increased by the incorporation of calcium fluoride. The addition of calcium fluoride also gives a flux having a lower melting point compared with, for example, a binary mixture of calcium oxide and alumina, resulting in improved reaction kinetics between the molten lag and molten steel. Furthermore the presence of fluorine ions in a calcium oxide-alumina slag may also result in the formation of volatile aluminium fluoride or a volatile double fluoride such as $CaF_2.AlF_3$ thereby producing a stirring of the melt and increasing the rate of transfer of sulphur to the slag. The addition of magnesium fluoride is beneficial as it lowers the melting point and increases the sulphur retention capacity of the slag. Additionally, due to its high vapour pressure, magnesium fluoride dissociates to produce magnesium and fluorine ions, and the former will react with soluble oxygen and sulphur ions and promote random dispersal of any inclusions in the steel. Sodium oxide is a highly basic compound and coupled with its effectiveness as a fluxing agent improves the performance of the composition as a desulphurising slag. Its presence is also desirable when the prefused particulate flux is made by melting the components in an electric arc furnace because sodium oxide improves the electrical conductivity characteristics of the composition. Zirconium oxide and titanium oxide are beneficial as they enhance removal of nitrogen from the molten metal due to conversion to nitrides.

Flux compositions of the above type may also be used to desulphurise iron. In order to achieve simultaneous desulphurisation and dephosphorisation, the compositions of the invention preferably contain a constituent such as iron oxide. The presence of iron oxide, for example, is required to produce a basic, highly oxidising slag which is necesssary for removing phosphorus from liquid iron at normal production temperatures.

Preferred compositions for desulphurising and dephosphorising iron contain prefused amorphous particles consisting of, by weight:
  35-70% calcium oxide
  20-40% iron oxide
  0-15% calcium fluoride
  0-15% magnesium fluoride
  0-15% sodium fluoride
  0-15% sodium oxide.

The prefused, amorphous, particulate flux compositions of the invention may also be used as mould fluxes in the continuous casting of metals, and particularly in the continuous casting of steel, and the invention also includes a method of continuously casting a molten metal in a mould which comprises adding to the mould prior to or during teeming a flux composition which comprises prefused particles comprising calcium oxide and at least one other component and in which each particle has a substantially vitreous amorphous structure.

In this application the flux is required to protect the molten metal from air oxidation, to remove oxide impurities contained in the molten metal and to act as a lubricant between the mould and the solidified strand of continuously cast metal. Compositions for use as mould fluxes may contain amorphous particles consisting of, by weight:
  30-60% calcium oxide
  30-60% silica
  0-15% calcium fluoride
  0-15% magnesium fluoride
  0-20% sodium oxide
  0-15% sodium borate.

The prefused amorphous particles may also be used in conjunction with other materials which are commonly used as constituents of continuous casting mould fluxes, for example, up to 15% by weight perlite or up to 15% by weight of obsidian to control the density and/or up to 15% by weight of a carbonaceous material such as "amorphous" or crystalline graphite, petroleum coke dust or carbon black to control the density and/or the melting rate of the flux.

The prefused amorphous particulate flux compositions of the invention have a number of advantages over known calcium oxide containing powder compositions and/or calcium silicide when used in the treatment of molten ferrous metals:

(1) They are highly resistant to hydration. They therefore have a very low hydrogen content and do not introduce hydrogen into molten metal.
(2) Since each particle has the same amorphous structure the compositions are more homogenous.
(3) They have a congruent melting point or a very small range of temperature over which they melt.
(4) Their melting point or melting temperature range is significantly lower than the melting point of the individual major constituents of the compositions. As a result they have a faster melting rate and a higher rate of reactivity with elements such as sulphur or phosphorus when used to treat molten iron or steel thereby giving a specific reduction in sulphur or phosphorus in the molten metal in a shorter time.
(5) They are effectively dust free and free flowing.

The following examples will serve to illustrate the invention:

EXAMPLE 1

Prefused amorphous particulate flux compositions were prepared containing the following constituents in the following proportions by weight:
(1)
  42.75% calcium oxide
  42.75% alumina
  9.5% calcium fluoride
  5.0% sodium oxide
(2)
  47.5% calcium oxide
  38.0% alumina
  9.5% calcium fluoride
  5.0% sodium oxide
(3)
  47.5% calcium oxide
  38.0% alumina
  4.75% calcium fluoride
  4.75% magnesium fluoride
  5.0% sodium oxide
(4)
  52.25% calcium oxide
  33.25% alumina
  9.5% calcium fluoride
  5.0% sodium oxide
(5)
  52.25% calcium oxide
  33.25% alumina
  4.75% calcium fluoride
  4.75% magnesium fluoride
  5.0% sodium oxide (6)
  57.0% calcium oxide
  28.5% alumina
  4.75% calcium fluoride
  4.75% magnesium fluoride
  5.0% sodium oxide the fluxes were injected into molten steel in 160 kg and 500 kg capacity induction furnaces at depths of 0.25–0.30 m and in 3000 to 4000 kg capacity ladles at depths of 0.5–0.7 m.

The results contained are shown in the following table:

| FLUX | CaSi | CaSi | CaSi | CaSi | CaSi | 1 | 4 | 5 | 5 | 5 | 5 |
|---|---|---|---|---|---|---|---|---|---|---|---|
| TEMPERATURE °C. | 1650 | 1620 | 1625 | 1590 | 1592 | 1630 | 1635 | 1618 | 1623 | 1595 | 1585 |
| STEEL WEIGHT (KG) | 160 | 350 | 440 | 2890 | 2635 | 160 | 160 | 500 | 350 | 2800 | 2655 |
| ADDITION (KG/T) | 16.25 | 5.71 | 5.68 | 3.15 | 3.80 | 8.62 | 9.78 | 4.48 | 6.18 | 2.82 | 3.77 |
| INJECTION TIME (SECS) | 155 | 135 | 166 | 310 | 406 | 120 | 265 | 172 | 224 | 300 | 355 |
| INITIAL SULPHUR (WT %) | 0.0071 | 0.031 | 0.037 | 0.017 | 0.019 | 0.109 | 0.063 | 0.049 | 0.055 | 0.019 | 0.020 |
| FINAL SULPHUR (WT %) | 0.0018 | 0.005 | 0.004 | 0.007 | 0.0033 | 0.035 | 0.010 | 0.0049 | 0.0008 | 0.009 | 0.006 |

The hydration characteristics of the compositions were examined by measuring weight gain, due to adsorption of water and chemical conversion of the calcium oxide to the hydroxide and carbonate in a controlled humidity cabinet at 86% relative humidity and 30° C.

The results obtained are shown graphically in the accompanying diagrammatic drawings 1–5.

FIG. 1 shows a comparison between prefused compositions 1 and 2 and fluxes of the same composition but produced by simple mechanical mixing of the components. The mechanically mixed compositions showed a weight increase of 30–35% over a period of 28 days whereas the prefused compositions increased in weight by only approximately 1%.

FIG. 2 shows the effect of particle size on hydration characteristics for compositions 1 and 2 for samples crushed and graded to less than 0.15 mm, for samples crushed and graded to 0.2–1.0 mm, and in the case of composition 1 for a sample obtained by rapidly cooling the fused composition to produce particles in the range 0.2–1.0 mm without crushing. Although the crushed samples showed relatively good resistance to hydration it is believed that the crushing operation exposes surfaces cooled at a lower cooling rate compared with the original surface of the particles and that these surfaces are more reactive to the atmosphere. The sample which had not been crushed had excellent resistance to hydration showing negligile weight increase over a period of 16 days.

FIG. 3 shows the hydration characteristics of all six compositions when fused, quenched and crushed to produce particles in the range 0.2–1.0 mm.

FIG. 4 shows the effect of cooling rate of the fused compositions from a temperature of 1500° C. on hydration characteristics for compositions 3 and 4. Although relatively good hydration resistance is shown by compositions which are air cooled, more rapid cooling as obtained by water quenching is clearly advantageous.

FIG. 5 shows similar results to those in FIG. 4 for composition 2 and in addition shows that even more beneficial results are obtained by agitation of the quench tank using nitrogen.

EXAMPLE 2

Figure 1:
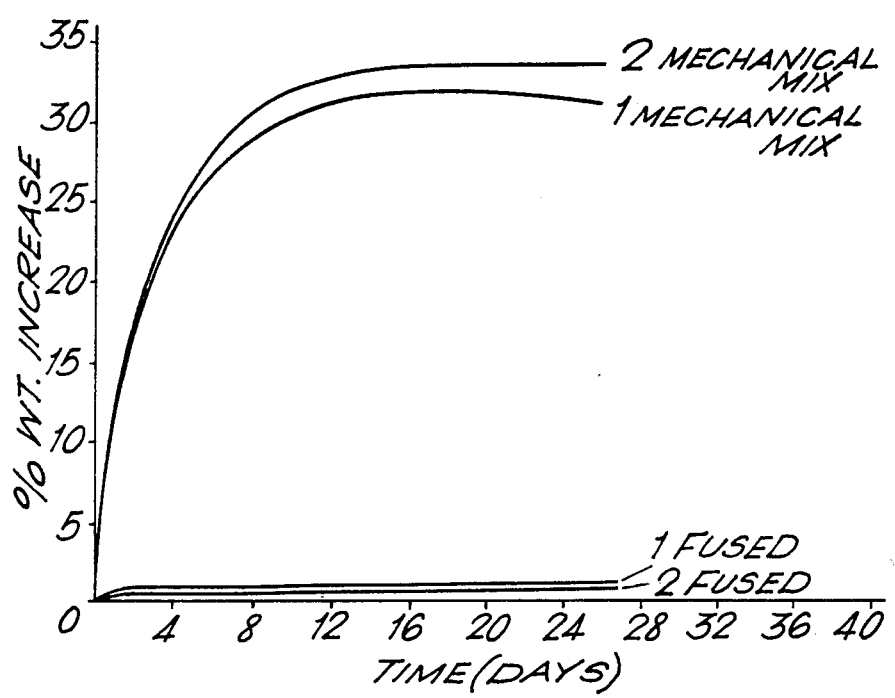

A series of tests was carried out to compare compositions 1, 4 and 5 of Example 1 with calcium silicide as desulphurising fluxed for molten steel.

Controlled orifice and screw feed injectors were used to transport the fluxes using argon as the carrier gas and Metallographic examination of as cast samples taken from the 2890 kg melt treated with calcium silicide and the 2605 kg melt treated with flux composition 5 indicated that the amorphous fused composition produced a significantly cleaner metal than calcium silicide, with fewer, small oxide inclusions which were uniformly dispersed, no large glassy calcium aluminate inclusions and elimination of alumina cloud inclusions.

Examination of 100×150 mm cross-section hot rolled ingots subjected to 50%, 90% and 98% reduction in area indicated that calcium silicide treatment produced relatively dirty steel with large complex oxide inclusions and elongated manganese sulphide inclusions even at a final sulphur content of 0.0018%. The fused amorphous composition produced a significantly cleaner steel with only a few small discrete non-deformable oxide/sulphide inclusions.

We claim:

1. A particulate flux composition which comprises particles comprising 35–70% by weight calcium oxide and at least 20% by weight of at least one other component of each of said particles selected from the group consisting of alumina and iron oxide, and in which each of said particles has a substantially vitreous amorphous structure.

2. A flux composition according to claim 1 wherein the said particles have a structure which is more than 80% amorphous.

3. A flux composition according to claim 2 wherein the said particles have a structure which is more than 95% amorphous.

4. A flux composition according to claim 1 wherein the said particles also contain at least one material selected from the group consisting of calcium fluoride, magnesium fluoride, sodium fluoride, sodium oxide, zirconium oxide and titanium oxide.

5. A flux composition according to claim 4 in which the said particles comprise by weight:
  35–70% calcium oxide
  20–60% alumina
  0–15% calcium fluoride
  0–15% magnesium fluoride
  0–20% sodium oxide 6. A flux composition according to claim 5 in which the said particles comprise by weight:
  35–70% calcium oxide
  20–60% alumina
  3–10% calcium fluoride
  3–10% magnesium fluoride 5-15% sodium oxide 7. A flux composition according to claim 4 in which the said particles comprise by weight:

35-70% calcium oxide 20-40% iron oxide 0-15% calcium fluoride 0-15% magnesium fluoride 0-15% sodium fluoride 0-15% sodium carbonate.

8. A flux composition according to claim 1 and in which the said particles contain in addition a colouring material.

9. A flux composition according to claim 8 wherein the colouring material is chromic oxide or potassium permanganate.

10. A flux composition according to claim 8 wherein the amount of colouring material present is 0.1-2.0% by weight.

11. A method of desulphurising molten steel comprising contacting the molten steel with a flux composition according to claim 1.

12. A method of desulphurising and/or dephosphorising molten iron comprising contacting the molten iron with a flux composition according to claim 1.

13. A particulate flux composition which comprises particles wherein each particle includes 35-70% by weight of a calcium oxide component and at least 20% by weight of at least one other flux component selected from the group consisting of alumina and iron oxide, said components being fused together to give each of said particles a substantially vitreous amorphous structure, said particulate flux composition being characterized by its resistance to hydration.

* * * * *